United States Patent [19]
Gehrke

[11] Patent Number: 5,718,633
[45] Date of Patent: Feb. 17, 1998

[54] UNIVERSAL JOINT WEAR INDICATOR

[75] Inventor: Glenn F. Gehrke, Davisburg, Mich.

[73] Assignee: Meritor Heavy Vehicle Systems, LLC

[21] Appl. No.: 401,189

[22] Filed: Mar. 9, 1995

[51] Int. Cl.[6] .................... F16D 3/16; G08B 19/00
[52] U.S. Cl. .................... 464/23; 464/136; 116/218
[58] Field of Search .................. 464/23, 136, 11, 464/14, 31, 185; 116/217, 218; 374/160, 153, 141

[56] References Cited

U.S. PATENT DOCUMENTS

| | | | |
|---|---|---|---|
| 3,401,666 | 9/1968 | Munroe | 116/114.5 |
| 3,603,280 | 9/1971 | Zahuranec | 116/218 |
| 3,682,130 | 8/1972 | Jeffers | 116/114.5 |
| 3,693,579 | 9/1972 | Kliewer | 116/218 |
| 3,759,103 | 9/1973 | Volk | 116/218 X |
| 3,813,178 | 5/1974 | Herbenar et al. | 403/27 |
| 3,820,499 | 6/1974 | Kliewer et al. | 116/217 X |
| 3,890,052 | 6/1975 | Herbenar et al. | 403/27 |
| 4,289,088 | 9/1981 | Scibelli | 116/218 |
| 4,356,790 | 11/1982 | Gee | 116/216 |
| 4,365,643 | 12/1982 | Masclet et al. | 116/218 X |
| 4,445,875 | 5/1984 | Kosuda et al. | 464/14 |
| 4,626,121 | 12/1986 | Tajima et al. | 403/27 |
| 4,660,247 | 4/1987 | Frohbieter et al. | 464/31 X |
| 4,818,119 | 4/1989 | Busch et al. | 374/208 |
| 4,947,786 | 8/1990 | Maynard et al. | 116/218 |
| 5,188,564 | 2/1993 | Keller | 464/14 |
| 5,315,954 | 5/1994 | Richmond | 116/218 X |

FOREIGN PATENT DOCUMENTS

| | | |
|---|---|---|
| 428092 | 4/1927 | Germany. |
| 640144 | 8/1977 | U.S.S.R. |

*Primary Examiner*—John P. Darling
*Assistant Examiner*—William A. Rivera

[57] ABSTRACT

An end of life indicator for a universal joint comprises an indicator member that monitors the temperature of the cross member of the universal joint. As the universal joint approaches the end of its life, the cross member exceeds expected temperatures as the bearings begin to wear. At a temperature above the typical operational temperature expected with a properly functioning universal joint, but below the temperature wherein the universal joint could be damaged or seize, a portion of the temperature indicator melts allowing the indicator to move to the actuated position. An operator will be able to visually identify the universal joint as approaching the end of its life. In one preferred embodiment, the indicator includes a plug at a position spaced forwardly of the indicator piston, with the plug holding the piston at the non-actuated position. When the plug melts, the indicator is spring biased to an outwardly actuated position where the operator will be able to visually identify an actuated indicator.

17 Claims, 1 Drawing Sheet

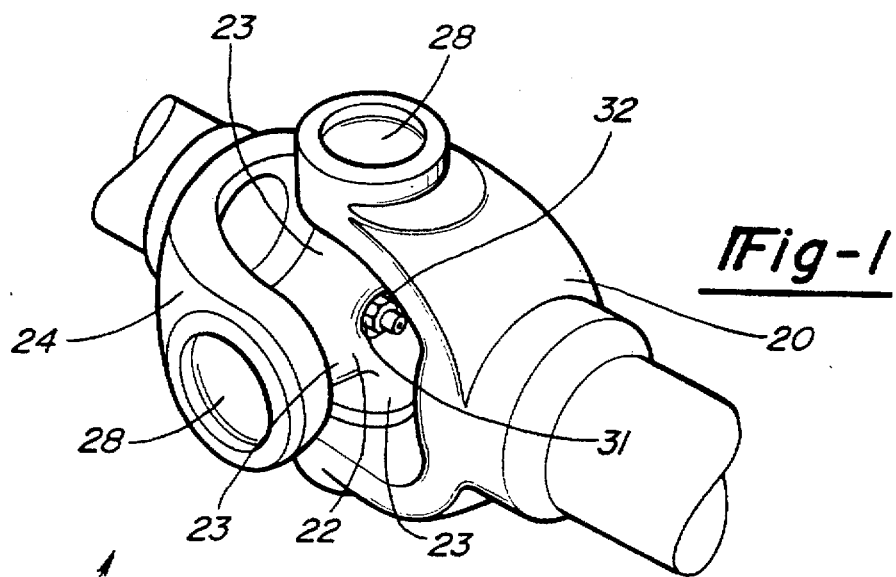
Fig-1
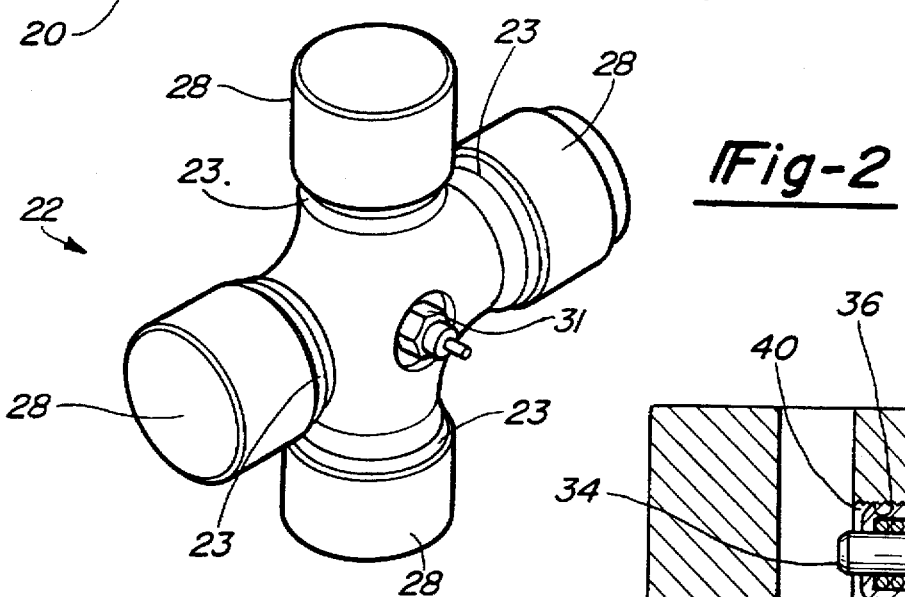
Fig-2
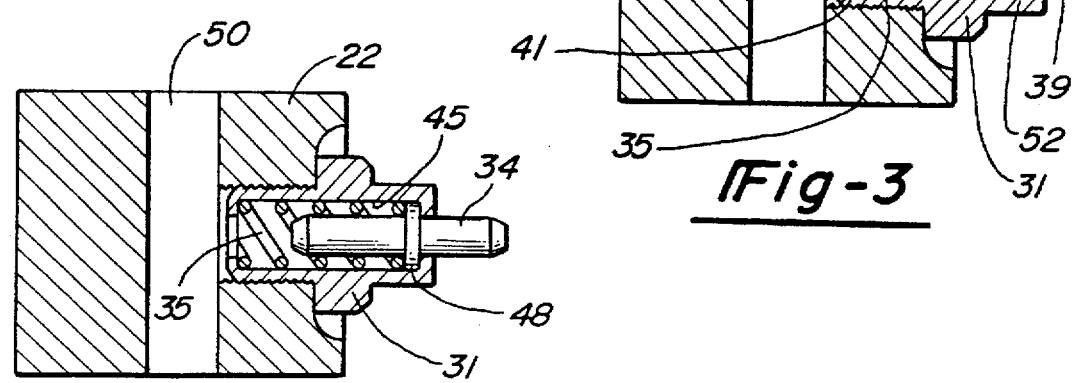
Fig-3
Fig-4

UNIVERSAL JOINT WEAR INDICATOR

BACKGROUND OF THE INVENTION

This application in general relates to a device to provide an indication as a universal joint nears the end of its useful life.

Heavy vehicles are equipped with universal joints that comprise a cross member having four shafts or trunnions. Bearings are mounted on each shaft. Two yokes are mounted onto two shafts. The yokes are mounted at positions spaced 90° relative to each other and are each connected to drive shafts. This arrangement allows rotation to be transmitted between the drive shafts, through varying angles. This type of universal joint is particularly popular in heavy duty vehicles such as trucks.

Proper functioning of a universal joint requires adequate lubrication between the bearings and the shafts. In the past, technicians have periodically relubricated the bearings and shafts. During this lubrication process, the universal joint was checked to ensure that it did not need to be replaced. The periodic maintenance checks allowed the technician to predict the end of useful life for the universal joint, and to replace the universal joints before failure.

More recently, universal joints have been developed that do not require any lubrication after assembly. The new universal joints eliminate the periodic maintenance that provided for checking the universal joint. Some universal joint maintenance system would thus be beneficial.

Various heat actuated indicators are known in the prior art to indicate a particular temperature for items being monitored. The monitored items have ranged from food being cooked, to axles or bearings. The prior art indicators have typically been structured to monitor immediately unacceptable conditions such as an unacceptably hot bearing or axle. Moreover, the prior art indicators have not been constructed to survive in the hostile environment that is experienced on the underside of a vehicle.

SUMMARY OF THE INVENTION

In a disclosed embodiment of this invention, an indicator is placed within the cross member of a universal joint. The indicator monitors the temperature of the cross member, which increases as the universal joint approaches the end of its useful life. The indicator is carefully designed to actuate at a temperature that exceeds an extreme of the cross member normal operational temperature. The extreme cross member temperature would only be expected as the universal joint components begin to wear, to the extent that the joint is approaching the end of its useful life. At the same time the actuation temperature is not so high that it would result in damage to any of the components.

In one embodiment of this invention, the temperature actuated indicator is mounted at the center of the cross member. In a preferred embodiment, the temperature indicator includes a housing threaded within a bore formed in the cross member. Most preferably, the bore includes a first internal portion that has a relatively small diameter, and a second outer portion that has a relatively greater diameter. The first portion is threaded. The second portion provides a stop surface for the indicator housing. The indicator housing preferably has an enlarged outer portion with an end face abutting an end face of the enlarged portion of the bore, thus insuring that the indicator is securely mounted and properly fitted within the bore. A universal joint, and thus, the indicator, is subject to a good deal of vibration, and is mounted in a hostile environment. As such, the mounting of the indicator in the bore ensures that the indicator is adequately protected, and remains operational as the universal joint approaches the end of its useful life.

In one preferred embodiment of this invention, the indicator includes a piston slidably mounted within the indicator housing. The piston is spring-biased outwardly of the indicator housing. A plug formed of a material that melts at a design temperature is placed at an outer end of the housing, retaining the piston within the housing. When the cross member reaches the design melt temperature, the plug melts. The piston is then free to move outwardly of the housing. The piston is preferably brightly colored to provide a good visual indication of the fact that the universal joint is approaching the end of its useful life.

Preferably, the design melt temperature is selected to be between 140° F. and 200° F. More preferably, the design melt temperature is selected to be between 140° F. and 175° F. In a most preferred embodiment the design melt temperature is between 150° F. and 155° F.

The material utilized for the melt member is preferably bismuth alloy, although other materials may also be used. One suitable alloy is available under the trade name CERRO ALLOY from Cerro Metal Products Co. of Bellefonte, Pa.

These and other features of the present invention can be best understood from the following specification and drawings, of which the following is a brief description.

BRIEF DESCRIPTION OF THE DRAWINGS

FIG. 1 shows a universal joint incorporating the present invention.

FIG. 2 is a perspective view of a cross member of a universal joint incorporating the present invention.

FIG. 3 is a cross sectional view through the indicator in an unactuated condition.

FIG. 4 shows the indicator of FIG. 3 having been actuated.

DETAILED DESCRIPTION OF A PREFERRED EMBODIMENT

Universal joint 20 is illustrated in FIG. 1, and incorporates a cross member 22 which is formed with four shafts 23. Yokes 24 and 26 are each received on two of the shafts 23. As shown, bearings 28 are received on each shaft 23 and provides for relative rotation between the yokes 24 and 26 and the shafts. The structure described to this point is as known in the art and forms no portion of this invention.

The inventive aspects of this invention relate to an end of life indicator 32 for the universal joint 20. A brightly colored indicator piston is normally retained within housing 31. The indicator is designed, as explained below, to be released as the universal joint approaches the end of its useful life. An operator who wishes to check the condition of the universal joint 20 can look at the indicator 32. If the operator cannot see the brightly colored indicator, the operator will know the universal joint should still be operational for additional time.

As shown in FIG. 2, the cross member 22 incorporates four shafts 23, each receiving a bearing 28. In the past, the bearings 28 and yokes 24 and 26 were assembled with the cross member 22 being placed within the yokes 24 and 26. The bearings 28 were then placed on the shafts and within the yokes. Assemblers were charged with providing proper lubrication. The assemblers did not always properly lubricate the universal joints. Thus, universal joints have been developed that are preassembled to require no assembly lubrication.

With such universal joints, the operator will not periodically check the condition of the universal joint as routine lubrication is also not required. Instead, indicator 32 provides the operator with an indication of when the universal joint 22 is approaching the end of its useful life. As shown in FIG. 2, the indicator piston 34 is actuated. The operator will now know the universal joint 22 is approaching the end of its useful life. As shown, the indicator 32 is placed on the center of the cross member, preferably equally spaced from each of the four shafts 23. The universal joint typically begins to fail with the bearings 28 beginning to fail. As the bearings 28 fail, the cross member 22 begins to heat up. As will be explained, as the cross member becomes hotter, eventually, a design temperature is reached and the indicator is actuated.

As shown in FIG. 3, housing 31 is received within bore 36. Piston 34 includes a ring 38. Spring 35 reacts off ring 38, forcing piston 34 against a plug 39. Plug 39 is formed of a material that melts at a relatively low temperature. A first portion 40 of bore 36 is formed with a screw thread, and has a relatively small diameter. A portion 41 of housing 31 is threadably received within bore portion 40. An outer portion 42 of the indicator housing 31 abuts an end face of a larger portion 44 of the bore 36. Outer portion 42 ensures that indicator housing 31 is fully threadably received within bore 36. Moreover, the larger portion 44 provides protection to the indicator housing 31. As should be appreciated, indicator 32 is mounted in a hostile environment beneath a vehicle and is subject to a good deal of vibration. The secure mount ensures that the indicator will be able to survive for the years that it may be in service.

The plug 39 is formed of a material that will melt at a relatively low temperature when compared to the metallic components forming the remainder of the universal joint. As the universal joint 20 begins to approach the end of its useful life, the needle bearings within the bearings 28 will also begin to fail. This will cause the cross member 22 to reach higher temperatures than would be expected under normal operation of the universal joint. The plug 39 is designed such that it will melt at a temperature that is above the highest expected normal temperature for the cross member 22, but that is still below a temperature that would cause damage to the components of the universal joint 20, or that could result in failure or seizure of those components. As shown in FIG. 3, the plug 39 is formed at an outer end of a central bore 45 of the housing 31.

As shown in FIG. 4, the plug 39 has melted, and the piston 34 now extends outwardly of the bore 45. The spring 35 has biased the piston 34 outwardly. An operator will now be able to visually inspect the universal joint 20, and immediately determine that the universal joint is approaching the end of its useful life, and that the bearings or other components should be replaced or inspected.

As also shown in FIG. 4, the ring portion 38 of piston 34 abuts an end face 48 of the housing 31, preventing further outward movement. A lubricant groove 50 is formed within the center of the cross member 22, and extends to each of the axles 23.

As also shown, enlarged portion 42 of the housing 31 merges into a final outer portion 52. The final outer portion can be seen in FIG. 4 extending outwardly of the outer bore portion 44. Outer portion 52 of the housing 31 can be seen to extend the piston 34 further outwardly away from an end face of the cross member 22. It must be remembered that the universal joint 20 is mounted beneath a vehicle, and thus may be encrusted with mud, salt, etc. Moving the piston 34 further away from the face of the cross member 22 increases its visibility. Moreover, the outer portion 52 also protects the extended piston 34 reducing the likelihood that it will be broken away from its extended position before an operator is able to see the extended piston 34.

Disposing the plug 39 at the forward end of bore 45, ensures that there will be no build up of salt and other road debris, clogging movement of piston 34. In other types of indicators wherein a meltable member is positioned rearwardly on an indicator, such debris may prevent movement of the indicator.

In one embodiment of this invention, the meltable plug 39 melts at a temperature selected to be between 140° F. and 200° F. More preferably, the material melts at a temperature between 140° F. and 175° F. Most preferably, the material melts at a temperature between 150° F. and 155° F., and more preferably at 154° F. A particular material presently envisioned for the plug is a bismuth containing alloy, such as described above.

Although a preferred embodiment of this invention has been disclosed, a worker of ordinary skill in the art would recognize that certain modifications come within the scope of this invention. For that reason, the following claims should be studied to determine the true scope and content of this invention.

I claim:

1. A universal joint cross member incorporating an end of life indicator comprising:

a universal joint cross member having four shafts spaced by 90° relative to each other, and having a central body portion connecting said four shafts;

an indicator received within said body portion, said indicator being movable between an actuated and a non-actuated position, said indicator being in a position where an operator will be able to see said indicator when said indicator is in said actuated position, and said indicator being maintained in a less visible position when in said non-actuated position, and there being a member formed of a material selected to melt at a design temperature, preventing said indicator from moving from said non-actuated position to said actuated position until said body reaches said design temperature, said member further obstructing view of said indicator when said indicator is in said non-actuated position; and said member is a plug positioned within an indicator housing and holding said indicator within said housing, said plug melting at said design temperature to allow said indicator to move to said actuated position where said indicator extends outwardly of said housing.

2. A universal joint as recited in claim 1, wherein a spring biases said indicator outwardly of said housing and against said plug.

3. A universal joint as recited in claim 2, wherein said housing is threadably received within a bore in said cross member.

4. A universal joint as recited in claim 3, wherein said housing includes a smaller diameter portion threadably received within a smaller bore portion in said cross member, and said housing also includes an enlarged portion abutting an end face of a bore in said cross member to properly mount said housing relative to said cross member.

5. A universal joint as recited in claim 1, wherein said indicator is mounted at a generally central axis of said cross member equally spaced from each of said four shafts.

6. A universal joint as recited in claim 1, wherein said design temperature is between 140° F. and 200° F.

7. A universal joint as recited in claim 6, wherein said design temperature is between 140° F. and 175° F.

8. A universal joint as recited in claim 7, wherein said design temperature is between 150° F. and 155° F.

9. A universal joint as recited in claim 8, wherein said bore in said cross member includes an enlarged portion leading into a threaded smaller portion, said housing including an enlarged portion received in said enlarged portion of said bore and a smaller portion received in said smaller portion of said bore.

10. A universal joint as recited in claim 9, wherein said enlarged portion of said housing extends axially outwardly of said enlarged portion of said bore.

11. A method of providing an indication of the condition of a universal joint comprising the steps of:

providing a cross member having four shafts;

mounting bearing in each of said four shafts;

mounting two yokes, with each of said yoke being received on two of said shafts;

providing a temperature indicator in said cross member, said temperature indicator having an indicator member movable between a non-actuated position to an actuated position and further having a temperature-sensitive inhibiting member for inhibiting movement of said indicator member from said non-actuated position to said actuated position, where said inhibiting member is further adapted to obstruct visual view of said indicator member when said indicator member is maintained in said non-actuated position, and where when said cross member reaches a design temperature, said design temperature being selected to be above a normal operating temperature expected for said cross member, such that when said cross member reaches said design temperature it can be expected that the universal joint is reaching the end of its useful life, said inhibiting member ceases inhibiting said indicator and said indicator moves from said non-actuated to said actuated position and thereby said inhibiting member further ceases visually obstructing said indicator member; and monitoring said universal joint to visually determine whether said indicator has moved to said actuated position, and servicing said universal joint when said indicator has moved to said actuated position.

12. A universal joint comprising:

a cross member having four shafts spaced by 90° relative to each other, and a central body portion connecting said four shafts;

a pair of yokes, with each of said yokes being connected to two of said shafts;

an indicator received within said cross member, said indicator movable between an actuated position and a non-actuated position and being operable to provide a visual indication when said body portion exceeds a design temperature by said indicator moving from said non-actuated position to said actuated position, said design temperature being selected to be above a normal operational temperature for said cross member; and a member formed of a material that melts at said design temperature, said member holding said indicator in said non-actuated position and further obstructing visual view of said indicator until said design temperature is reached.

13. A universal joint as recited in claim 12, wherein said indicator comprises an indicator piston received within an indicator housing, and wherein said member comprises a plug, said plug being received at an outer end of a bore of said indicator housing and said indicator piston being slidable within said bore.

14. A universal joint as recited in claim 13, wherein a spring biases said indicator piston outwardly of said body.

15. A universal joint as recited in claim 12, wherein said design temperature is between 140° F. and 200° F.

16. A universal joint as recited in claim 15, wherein said design temperature is between 140° F and 175° F.

17. A universal joint as recited in claim 16, wherein said design temperature is between 150° F. and 155° F.

* * * * *